(12) United States Patent
Kimura et al.

(10) Patent No.: US 7,316,406 B2
(45) Date of Patent: Jan. 8, 2008

(54) VEHICLE HEIGHT ADJUSTING APPARATUS

(75) Inventors: Ryoji Kimura, Tokyo (JP); Masahito Taira, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 463 days.

(21) Appl. No.: 10/965,012

(22) Filed: Oct. 14, 2004

(65) Prior Publication Data

US 2005/0110229 A1   May 26, 2005

(30) Foreign Application Priority Data

Oct. 16, 2003 (JP) ............................. 2003-355878
Oct. 23, 2003 (JP) ............................. 2003-362671

(51) Int. Cl.
*B60S 9/00* (2006.01)
(52) U.S. Cl. ...................................... 280/6.157; 701/37
(58) Field of Classification Search ............. 280/6.153, 280/6.155, 6.157, 5.514, 5.507
See application file for complete search history.

(56) References Cited

U.S. PATENT DOCUMENTS

| | | | | |
|---|---|---|---|---|
| 5,259,017 | A * | 11/1993 | Langmantel | 455/555 |
| 6,293,562 | B1 * | 9/2001 | Kutscher | 280/6.159 |
| 7,025,361 | B1 * | 4/2006 | Erickson | 280/6.153 |
| 2002/0030586 | A1 * | 3/2002 | Katou et al. | 340/5.72 |
| 2002/0180172 | A1 * | 12/2002 | Gottschalk et al. | 280/124.157 |

FOREIGN PATENT DOCUMENTS

| | | |
|---|---|---|
| DE | 38 10 386 A1 | 10/1989 |
| DE | 199 05 172 A 1 | 8/2000 |
| EP | 1 028 536 A2 | 8/2000 |

OTHER PUBLICATIONS

Office Action issued on Dec. 8, 2005 in corresponding German patent application No. DE 10 2004 050 502.0.

* cited by examiner

*Primary Examiner*—Ruth Ilan
*Assistant Examiner*—Tiffany L. Webb
(74) *Attorney, Agent, or Firm*—Rossi, Kimms & McDowell LLP

(57) ABSTRACT

A wireless remote control radio-transmits a vehicle height adjusting signal tagged with a remote control identification code in order to improve vehicle height adjustment operability in a vehicle such as a truck. The remote control identification code is pre-registered in a receiver, which, upon receipt of the vehicle height adjusting signal tagged with the remote control identification code, takes in the vehicle height adjusting signal. According to information contained in the received vehicle height adjusting signal, an air suspension ECU controls the supply and discharge of compressed air for air springs to adjust the vehicle height. When an emergency operation switch is operated, the vehicle height adjusting signal from the wireless remote control is disabled, and vehicle height adjustment is preferentially made based on a switching signal from the emergency operation switch.

5 Claims, 10 Drawing Sheets

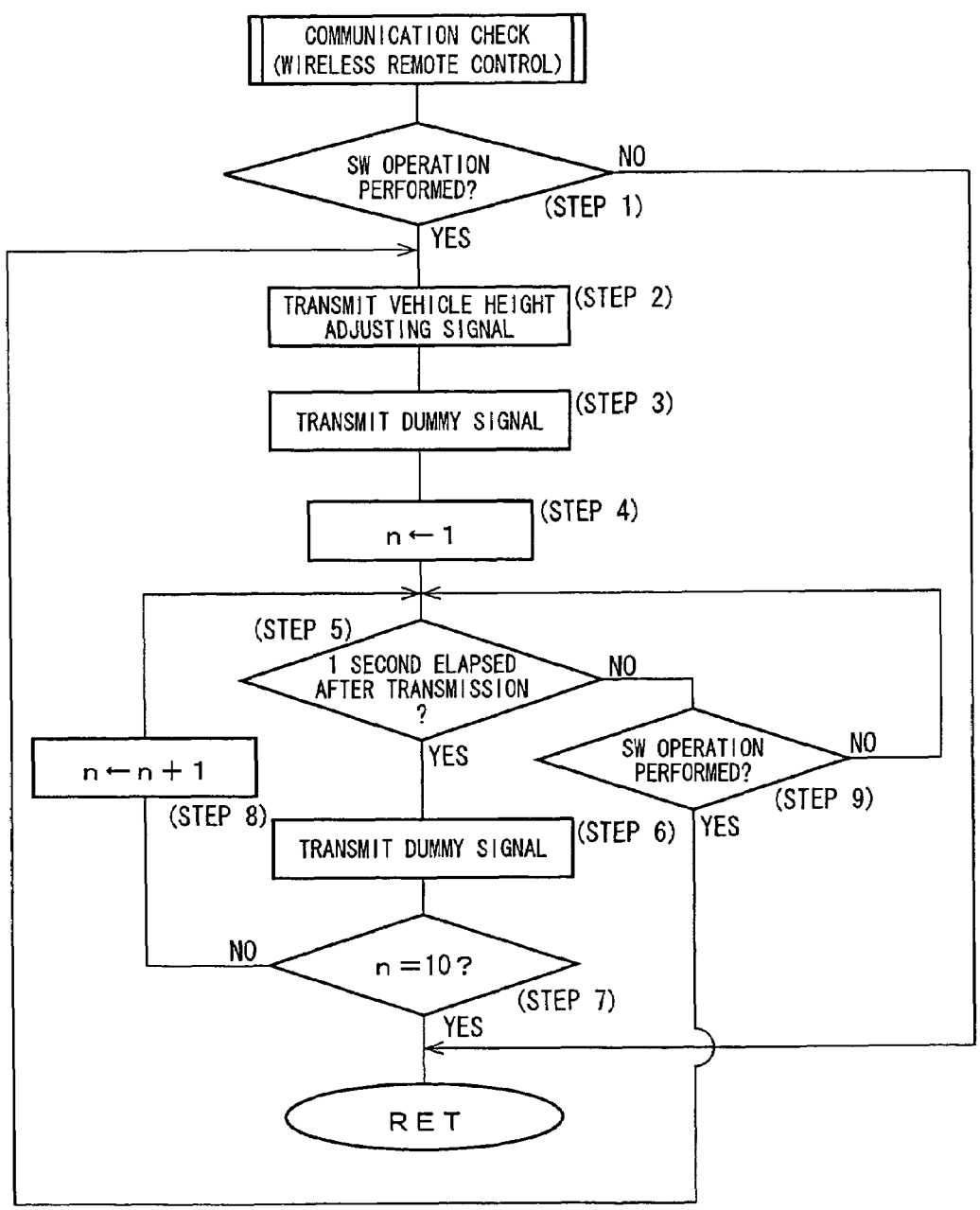

VEHICLE HEIGHT ADJUSTING APPARATUS

CROSS REFERENCE TO RELATED APPLICATION

The entire disclosure of Japanese Patent Application No. 2003-355878 filed on Oct. 16, 2003, and Japanese Patent Application No. 2003-362671 filed on Oct. 23, 2003, including specification, claims, drawings and summary, is incorporated herein by reference in its entirety.

BACKGROUND OF THE INVENTION

1. Field of the Invention

This invention relates to a vehicle height adjusting apparatus for adjusting the height of a vehicle based on an operating signal from a controller.

2. Description of the Related Art

A heavy duty truck or the like adopts an air spring as a spring of a suspension. A vehicle height (the height of a vehicle body frame from an axle) can be adjusted by controlling compressed air supplied to and discharged from the air spring. Concretely, the vehicle height can be raised by supplying compressed air to the air spring to increase the spring length. Conversely, the vehicle height can be lowered by discharging compressed air from the air spring to decrease the spring length. That is, a vehicle height adjusting apparatus is composed of the air spring, and a control mechanism for supplying compressed air to, and discharging compressed air from, the air spring. Since a truck or the like has such a vehicle height adjusting apparatus, the vehicle height can be controlled to the desired height during loading or unloading of cargo.

A conventional vehicle height adjusting apparatus provided in a truck will be described with reference to FIG. 11. In a truck 1, as shown in FIG. 11, a front axle air suspension portion 2 is disposed on a front axle, and a rear axle air suspension portion 3 is disposed on a rear axle. Under the control of an air suspension ECU (electronic control unit) 4, compressed air is supplied to and discharged from the air spring of each of the air suspension portions 2 and 3. An in-cab socket 5 is disposed within a cab of the truck 1, and a frame rear end socket 6 is disposed at the rear end of a truck frame.

A remote control 10 is a wired remote control. A connecting cable 12 is led from a remote control body 11 of the remote control 10, and a remote control socket 13 is connected to the front end of the connecting cable 12. In performing vehicle height adjustment, the remote control socket 13 is connected to one of the in-cab socket 5 and the frame rear end socket 6.

The remote control body 11, as shown, for example, in FIG. 12, is provided with switches, including a front axle selection switch SW1, a rear axle selection switch SW2, a first memory switch SW3, a second memory switch SW4, a neutral switch SW5, a raising switch SW6, a lowering switch SW7, and a stop switch SW8. When the selection switch SW1 or SW2 is pushed (i.e., with one push), an ON-state is produced. When the selection switch SW1 or SW2 is pushed again (i.e., with one push), the switch returns to an OFF-state. That is, the selection switches SW1 and SW2 each alternately repeat the ON-state and the OFF-state with one push.

The remote control body 11 is also provided with a front axle lamp L1 and a rear axle lamp L2. The front axle lamp L1 lights when the front axle selection switch SW1 is ON, and goes out when the front axle selection switch SW1 is OFF. The rear axle lamp L2 lights when the rear axle selection switch SW2 is ON, and goes out when the rear axle selection switch SW2 is OFF.

When the switches SW1 to SW8 are operated while the remote control socket 13 of the remote control 10 remains connected to one of the in-cab socket 5 and the frame rear end socket 6, the lengths of the air springs of the air suspension portions 2 and 3 are adjusted, in the manner described below, under the control of the air suspension ECU 4 to carry out vehicle height adjustment.

(1) At the push of the raising switch SW6 when the front axle selection switch SW1 is ON, compressed air is supplied to the air spring of the front axle air suspension portion 2 while the raising switch SW6 keeps pushed, whereby the vehicle height on the front axle side is raised.

(2) At the push of the lowering switch SW7 when the front axle selection switch SW1 is ON, compressed air is discharged from the air spring of the front axle air suspension portion 2 while the lowering switch SW7 keeps pushed, whereby the vehicle height on the front axle side is lowered.

(3) At the push of the first memory switch SW3 when the front axle selection switch SW1 is ON, control for supplying and discharging compressed air to and from the air springs of the front axle air suspension portion 2 and the rear axle air suspension portion 3 is exercised so that the vehicle heights at the front and rear axles are raised or lowered until they reach a first vehicle height position which has been stored beforehand.

(4) At the push of the second memory switch SW4 when the front axle selection switch SW1 is ON, control for supplying and discharging compressed air to and from the air springs of the front axle air suspension portion 2 and the rear axle air suspension portion 3 is exercised so that the vehicle heights at the front and rear axles are raised or lowered until they reach a second vehicle height position which has been stored beforehand.

(5) At the push of the neutral switch SW5 when the front axle selection switch SW1 is ON, control for supplying and discharging compressed air to and from the air springs of the front axle air suspension portion 2 and the rear axle air suspension portion 3 is exercised so that the vehicle heights at the front and rear axles are raised or lowered until they reach a neutral. (reference) vehicle height position which has been stored beforehand.

(6) At the push of the raising switch SW6 when the rear axle selection switch SW2 is ON, compressed air is supplied to the air spring of the rear axle air suspension portion 3 while the raising switch SW6 keeps pushed, whereby the vehicle height on the rear axle side is raised.

(7) At the push of the lowering switch SW7 when the rear axle selection switch SW2 is ON, compressed air is discharged from the air spring of the rear axle air suspension portion 3 while the lowering switch SW7 keeps pushed, whereby the vehicle height on the rear axle side is lowered.

(8) At the push of the first memory switch SW3 when the rear axle selection switch SW2 is ON, control for supplying and discharging compressed air to and from the air springs of the front axle air suspension portion 2 and the rear axle air suspension portion 3 is exercised so that the vehicle heights at the front and rear axles are raised or lowered until they reach the prestored first vehicle height position.

(9) At the push of the second memory switch SW4 when the rear axle selection switch SW2 is ON, control for supplying and discharging compressed air to and from the air springs of the front axle air suspension portion 2 and the rear axle air suspension portion 3 is exercised so that the vehicle heights at the front and rear axles are raised or lowered until they reach the prestored second vehicle height position.

(10) At the push of the neutral switch SW5 when the rear axle selection switch SW2 is ON, control for supplying and discharging compressed air to and from the air springs of the front axle air suspension portion 2 and the rear axle air suspension portion 3 is exercised so that the vehicle heights at the front and rear axles are raised or lowered until they reach the prestored neutral (reference) vehicle height position.

(11) At the push of the stop switch SW8 when the vehicle height is being raised or lowered, a raising action or a lowering action is urgently stopped.

(12) The front axle selection switch SW1 and the rear axle selection switch SW2 may be simultaneously rendered ON, and the vehicle heights on the front axle side and the rear axle side may be simultaneously raised (the raising switch SW6 may be pushed), or simultaneously lowered (the lowering switch SW7 may be pushed).

An ordinary technology for the vehicle height adjusting apparatus (air suspension control device) installed in the truck or the like is shown, for example, in Japanese Patent Application Laid-Open No. 2002-192928. This Japanese Patent Application Laid-Open No. 2002-192928 discloses a vehicle height adjusting apparatus for making vehicle height adjustment by use of a wired remote control as does that shown in FIGS. 11 and 12.

With the conventional vehicle height adjusting apparatus shown in FIGS. 11 and 12, the remote control 10 is of the wired type, thus giving a narrow operating range. Hence, when the driver of the truck gets off the truck, and operates a fork lift to do loading work for the truck, the driver cannot make vehicle height adjustment of the truck while riding the fork lift. That is, the driver has to get off the fork lift, connect the remote control socket 13 to the in-cab socket 5 or the frame rear end socket 6, and operate the switch of the remote control 10 near the truck 1. Otherwise, the driver cannot make vehicle height adjustment of the truck.

Depending on the operating situation, the driver may have to disconnect the remote control socket 13 of the remote control 10 from one of the in-cab socket 5 and the frame rear end socket 6, and then connect it to the other. This means poor operability.

The present invention has been accomplished in the light of the above-mentioned problems with the earlier technology. It is an object of the invention to provide a vehicle height adjusting apparatus which can make vehicle height adjustment even when the driver is separated from a vehicle (truck or the like), and which is safe and easy-to operate.

SUMMARY OF THE INVENTION

According to the present invention, there is provided a vehicle height adjusting apparatus including a controller, which transmits a vehicle height adjusting signal for adjusting a height of a vehicle, and vehicle height adjusting means for adjusting the height of the vehicle based on the vehicle height adjusting signal transmitted from the controller, wherein transmission of the vehicle height adjusting signal from the controller to the vehicle height adjusting means is performed by radio.

The vehicle height adjusting means may include auxiliary vehicle height adjusting means capable of adjusting the height of the vehicle by operating an emergency operation switch connected to the vehicle height adjusting means, and safety means which disables the vehicle height adjusting signal from the controller, if the auxiliary vehicle height adjusting means is in action, and no abnormality is detected in the emergency operation switch, and which enables the vehicle height adjusting signal from the controller, if the auxiliary vehicle height adjusting means is out of action, or if the auxiliary vehicle height adjusting means is in action, and an abnormality is detected in the emergency operation switch.

The expression "disables the vehicle height adjusting signal" means not to perform adjustment of the height of the vehicle based on the vehicle height adjusting signal. The expression "enables the vehicle height adjusting signal" means to perform adjustment of the height of the vehicle based on the vehicle height adjusting signal.

In the vehicle height adjusting apparatus including the controller, which transmits the vehicle height adjusting signal for adjusting the height of the vehicle, and the vehicle height adjusting means for adjusting the height of the vehicle based on the vehicle height adjusting signal transmitted from the controller, transmission of the vehicle height adjusting signal from the controller to the vehicle height adjusting means may be performed by radio, the controller may transmit dummy signals continuously for a predetermined period of time after transmitting the vehicle height adjusting signal, and the vehicle height adjusting means may have vehicle height adjustment interruption means for interrupting adjustment of the height of the vehicle if receipt of the dummy signals stops during the predetermined period of time.

The vehicle height adjusting means may include air springs provided in the vehicle, and air supply and discharge control means for adjusting the height of the vehicle by controlling supply and discharge of air within the air springs, and the vehicle height adjustment interruption means may have air supply and discharge interruption means for interrupting the adjustment of the height of the vehicle by interrupting supply and discharge of air within the air springs.

The controller may include free frequency channel detection means for detecting a free frequency channel, which is a frequency channel being free and other than a frequency channel used in radio transmission by other controller, before starting the transmission of the vehicle height adjusting signal by radio, and free frequency channel utilization means for transmitting the vehicle height adjusting signal and the dummy signals by utilizing the free frequency channel detected by the free frequency channel detection means.

The controller may include a controller identification code for uniquely identifying the controller, and identification code transmission means for radio-transmitting the controller identification code, and the vehicle height adjusting means may include identification code storage means for prestoring the controller identification code, and controller identification means which responds to the vehicle height adjusting signal from the controller only when the controller identification code stored by the identification code storage means and the controller identification code radio-transmitted by the controller agree with each other.

The vehicle height adjusting means may include air springs provided in the vehicle, and air supply and discharge control means for adjusting the height of the vehicle by controlling supply and discharge of air within the air springs.

According to the present invention, the vehicle height adjusting signal is radio-transmitted from the controller to the vehicle height adjusting means. Thus, it become unnecessary to disconnect the socket and then connect it again. Even if the driver is separated from the vehicle (for example, even if the driver rides a fork lift), vehicle height adjustment of the vehicle can be made, thus increasing the efficiency of loading work.

According to the present invention, moreover, vehicle height adjustment can be made preferentially by the auxiliary vehicle height adjusting means in accordance with the switching operation of the emergency operation switch. Thus, vehicle height adjustment can be made even if the controller is lost. Even when the controller (remote control) is operated during the operation of the emergency operation switch, priority is given to the switch operation. Thus, a possible danger can be prevented.

Furthermore, the safety means is provided for disabling vehicle height adjustment by the auxiliary vehicle height adjusting means in the event of an abnormality in the emergency operation switch (breakage or shorting of the switch signal line). Thus, operation by the controller (remote control) can be performed even in case of a failure in the emergency operation switch due to wire breakage or the like.

In the present invention, moreover, vehicle height adjustment is interrupted during an abnormality in radio communication. Thus, the risk that the stop switch becomes inoperable owing to a communication abnormality can be avoided. Also, the same frequency is not used by a plurality of controllers, so that interference minimally occurs. This can avoid a risk caused by the transmission of an unexpected vehicle height adjusting signal to the vehicle height adjusting means by interference. Besides, the dummy signals are transmitted for the predetermined period of time. During this period, the frequency channel concerned can be occupied. If other switching operation (controller operation) is performed within the predetermined period of time, the carrier sense (search for a free channel) at the start of communication becomes unnecessary, causing no delay in response.

According to the present invention, moreover, vehicle height adjustment adapted for the vehicle height adjusting signal is made only when the identification code for the controller and the identification code stored in the vehicle height adjusting means agree with each other. Thus, vehicle height adjustment is no more made mistakenly by vehicle height adjustment under the direction of other controller. The absence of such a function would pose the problem that when other vehicle equipped with the same vehicle height adjusting apparatus is located near one's own vehicle, and is making vehicle height adjustment, the vehicle height adjusting apparatus of one's own vehicle responds to the vehicle height adjusting signal radio-transmitted to the other vehicle, making the vehicle height adjustment of one's own vehicle unintentionally. This problem can be resolved by the present invention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a flow chart showing a communication check flow by a wireless remote control;

DETAILED DESCRIPTION OF THE PREFERRED EMBODIMENTS

In the best mode for carrying out the present invention, the operating range is widened by using a wireless remote control as a controller, and allowing the wireless remote control to transmit a vehicle height adjusting signal to a receiver by radio.

Immediately after transmission of the vehicle height adjusting signal by radio, dummy signals are transmitted from the wireless remote control to the receiver continuously for a predetermined period of time. Furthermore, if the receipt of the dummy signals stops within the predetermined period of time, the receiver determines that a communication abnormality has occurred, thereby interrupting a vehicle height adjusting action performed by an air suspension ECU. A vehicle height adjusting apparatus according to the present invention will be described in greater detail by embodiments with reference to the accompanying drawings, but the invention is not limited thereby.

Embodiment 1

<Outline of Features>

Figure 1:
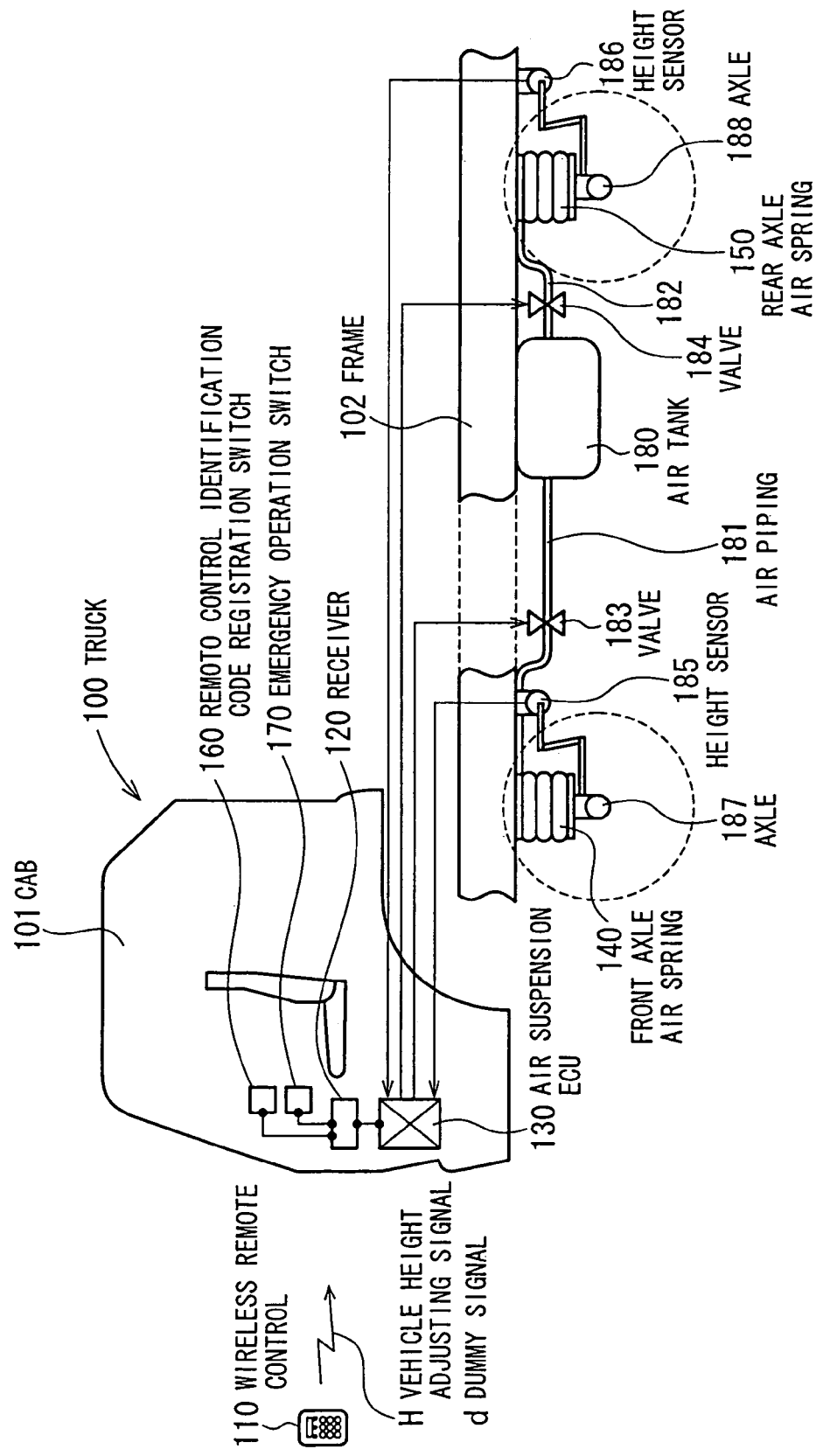
FIG. 1 is a configurational drawing showing a vehicle height adjusting apparatus according to Embodiment 1 of the present invention.
Figure 2:
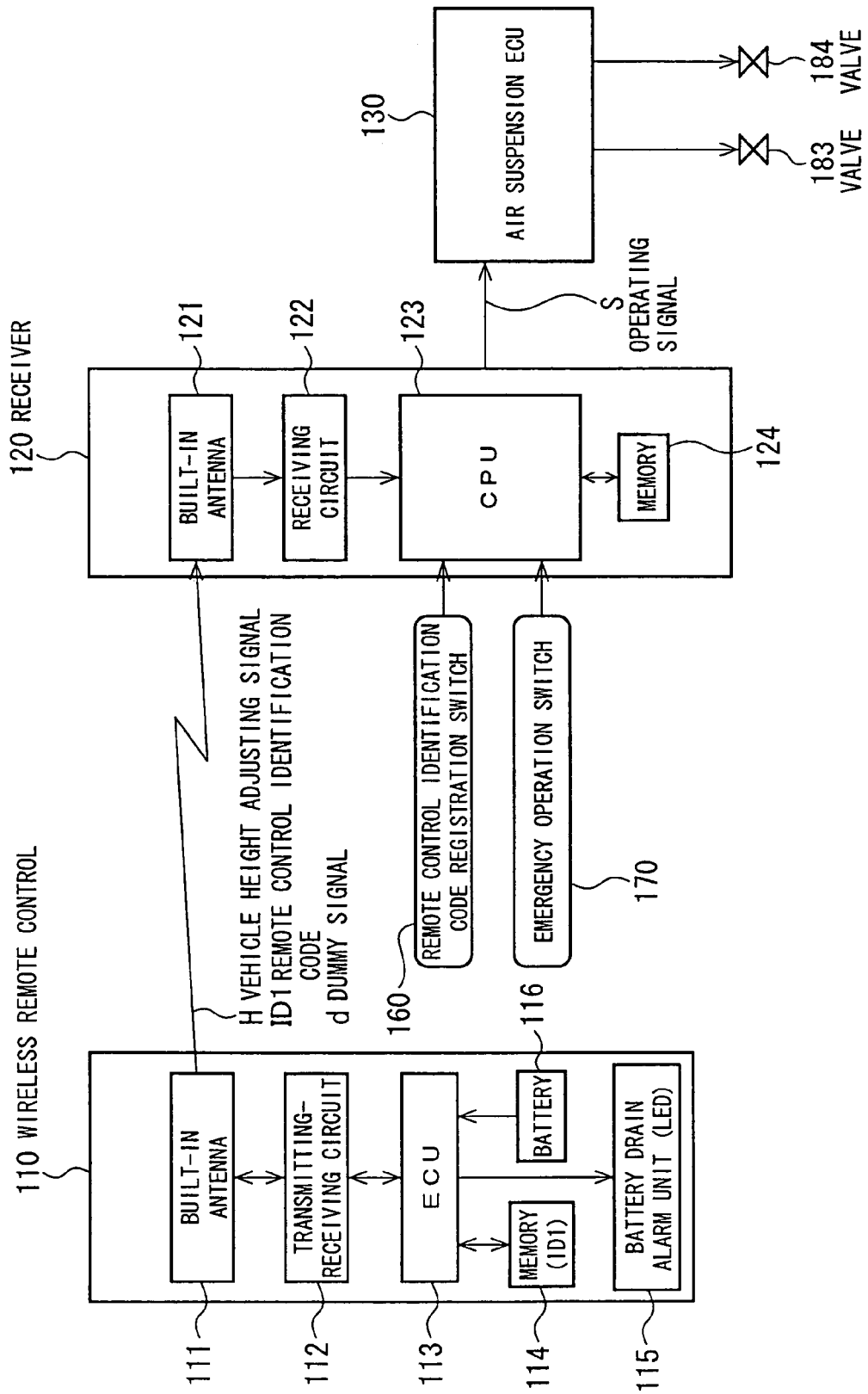
FIG. 2 is a block diagram showing a vehicle height adjusting apparatus according to Embodiment 1 of the present invention.

A vehicle height adjusting apparatus according to the present embodiment will be described with reference to FIG. 1 showing the layout of components, and FIG. 2 showing functional features. As shown in FIGS. 1 and 2, the vehicle height adjusting apparatus according to the present embodiment is composed of a wireless remote control (controller) 110, a receiver 120, an air suspension ECU 130, a front axle air spring 140, and a rear axle air spring 150 (vehicle height adjusting means), as major members. Air supply and discharge control means is constituted by the receiver 120 and the air suspension ECU 130.

<Outline of Actions>

The outline of actions in the present embodiment will be described first. A remote control identification code (controller identification code) of the wireless remote control 110 (the remote control identification code of the wireless remote control 110 is herein designated as, for example, ID1), which can distinguish (uniquely identify) the wireless remote control 110 from other wireless remote controls, is stored in the wireless remote control 110 and the receiver 120. A vehicle height adjusting signal H and the remote control identification code ID1 (namely, the vehicle height adjusting signal H tagged with ID1) are transmitted from the wireless remote control 110 by radio. After transmission of the vehicle height adjusting signal H tagged with ID1, dummy signals d are immediately transmitted continuously for a predetermined period of time (for example, 10 seconds).

Upon receipt of the vehicle height adjusting signal H tagged with the remote control identification code ID1, the receiver 120 determines whether the remote control identification code contained in the received signal agrees with the remote control identification code stored in the receiver 120 (identification code storage means). Only when these identification codes agree, the receiver 120 sends an operating signal S to the air suspension ECU 130 according to information on the vehicle height adjusting signal H contained in the received signal. Based on this operating signal S, the air suspension ECU 130 controls the supply and discharge of air into or out of the front axle air spring 140 and the rear axle air spring 150 to adjust the air spring lengths, thereby making vehicle height adjustment (controller identification means).

In the present embodiment, a determination of whether the remote control identification code ID1 contained in the signal transmitted from the wireless remote control 110 and the remote control identification code stored in the vehicle height adjusting means are in agreement with each other is made by the receiver 120. However, this determination, and storage of the remote control identification code may be performed by the air suspension ECU 130.

Furthermore, when the receiver 120, after receiving the vehicle height adjusting signal H, receives the dummy signals d continuously for the predetermined period of time (for example, 10 seconds), or receives a next vehicle height adjusting signal H within the predetermined period of time, the receiver 120 determines that the communication state is normal. However, if the receipt of the dummy signals d is interrupted within the predetermined period of time without reception of the next vehicle height adjusting signal H, the receiver 120 determines that a communication abnormality has occurred. Upon determination of the communication abnormality, the supply and discharge of air into and out of the air springs 140 and 150 by the air suspension ECU 130 is interrupted (vehicle height adjustment interruption means). Accordingly, if the occurrence of the communication abnormality is determined during (during the period of) the raising or lowering of the vehicle height until the vehicle height reaches a prescribed neutral (reference) vehicle height position, for example, the raising or lowering of the vehicle height is immediately stopped to ensure safety.

As will be described later, moreover, the wireless remote control 110 performs carrier sense to search for a channel of a free frequency (among frequency channels over which the wireless remote control 110 can transmit signals, "a free frequency channel" remaining after excluding frequency channels used for radio transmission by other wireless remote controls). The wireless remote control 110 uses the free frequency channel, found by this search, for starting transmission of the vehicle height adjusting signal H tagged with the remote control identification code ID1.

According to the present embodiment, the wireless remote control 110 transmits the dummy signals d continuously for the predetermined period of time even after transmission of the vehicle height adjusting signal H. Thus, the state of communication between the wireless remote control 110 and the receiver 120 is ensured during the predetermined period of time during which the dummy signals d are transmitted. In transmitting the next vehicle height adjusting signal H from the wireless remote control 110 during this predetermined period of time, therefore, the carrier sense (search for a free frequency channel) at the start of communication becomes unnecessary, and search by the receiver (to be described later) also becomes unnecessary. As a result, no delay in response occurs.

Next, the respective functional portions will be described individually.

<Explanation for the Wireless Remote Control>

The wireless remote control 110, as shown in FIG. 2, is equipped with a built-in antenna 111, a transmitting-receiving circuit 112, a CPU (central processing unit) 113, a memory 114, a battery drain alarm unit (LED, light emitting diode) 115, and a battery 116. An external antenna may be used instead of the built-in antenna 111.

The remote control identification code ID1 for uniquely identifying the wireless remote control 110 is prestored (preregistered) in the memory 114. The remote control identification code ID1 is composed of 20 bits.

Figure 3:
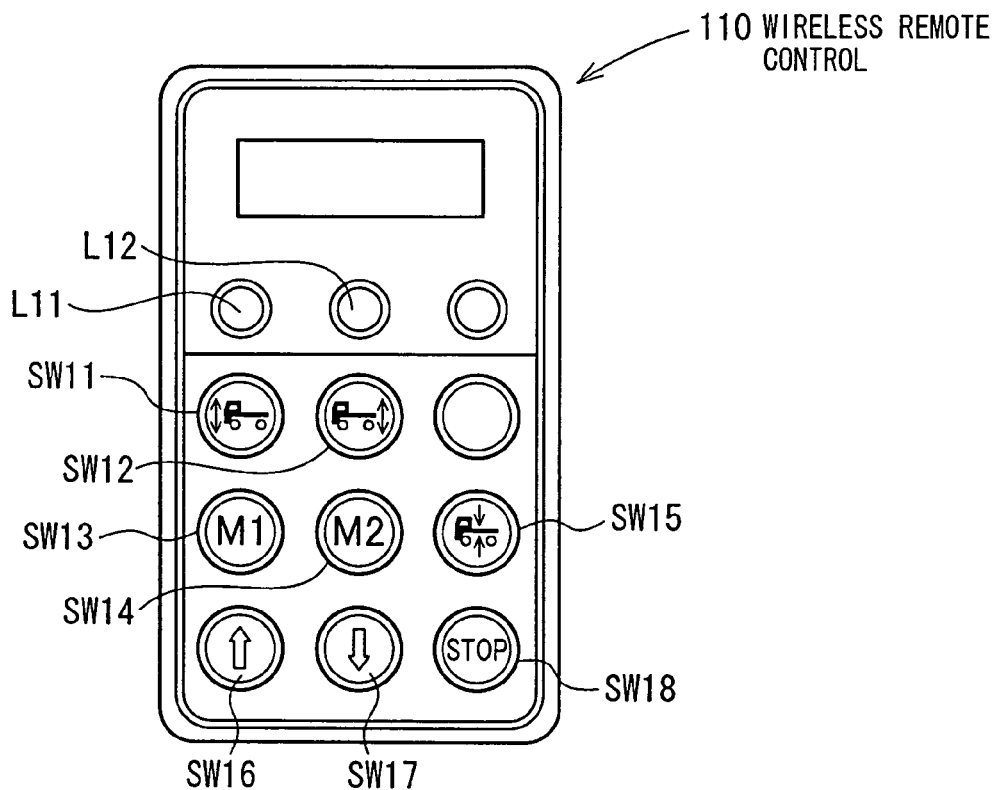
FIG. 3 is a configurational drawing showing switches of a wireless remote control.

The wireless remote control 111, as shown in FIG. 3, is provided with switches (push switches), including a front axle selection switch SW11, a rear axle selection switch SW12, a first memory switch SW13, a second memory switch SW14, a neutral switch SW15, a raising switch SW16, a lowering switch SW17, and a stop switch SW18. When the selection switch SW11 or SW12 is pushed (i.e., with one push), an ON-state is produced. When the selection switch SW11 or SW12 is pushed again (i.e., with one push), the switch returns to an OFF-state. That is, the selection switches SW11 and SW12 each alternately repeat the ON-state and the OFF-state every time they are pushed (with one push).

The wireless remote control 110 is also provided with a front axle lamp L11 and a rear axle lamp L12 which are indicator lamps. The front axle lamp L11 lights when the front axle selection switch SW11 is ON, and goes out when the front axle selection switch SW11 is OFF. The rear axle lamp L12 lights when the rear axle selection switch SW12 is ON, and goes out when the rear axle selection switch SW12 is OFF.

If no switch operation is performed before 60 seconds have passed since the front axle lamp L11 is lit after the front axle selection switch SW11 is turned on, the ON-state of the front axle selection switch SW11 is released, at a time when the period of 60 seconds has passed, to bring an OFF-state and extinguish the front axle lamp L11. Similarly, if no switch operation is performed before 60 seconds have passed since the rear axle lamp L12 is lit after the rear axle selection switch SW12 is turned on, the ON-state of the rear axle selection switch SW12 is released, at a time when the period of 60 seconds has passed, to bring an OFF-state and extinguish the rear axle lamp L12.

If the voltage of the battery 116 decreases to a set voltage or less, the CPU 113 lets the battery drain alarm unit 115 display an alarm state.

Communication specifications for the wireless remote control 110 are as follows: As the type of a radio station, "Specific Low Power Radio Station" is adopted. The "Specific Low Power Radio Station" is a radio station stipulated by the Japanese Radio Law. Among radio stations with an antenna power of 10 mW or less, the "Specific Low Power Radio Station" uses radio facilities which have received a technical standards conformance certificate. Thus, users of this radio station do not need a radio station license or a radio operator qualification. Hence, the output of the wireless remote control 110 is set at 10 mW or less.

The carrier frequency is 429.25 to 429.7375 MHz, and uses 7 CH (channels) to 46 CH (channels). A step (occupied frequency bandwidth) for 1 CH is set at 12.5 KHz.

As the communication system, a one way operation system with a carrier sense function is adopted. Since the carrier sense is provided, a free channel is determined, and transmission is started using a frequency band of this free channel. In detail, the wireless remote control 110 receives a radio wave from other wireless remote control (i.e., a wireless remote control other than the wireless remote control 110) by the built-in antenna 111, determines the channel (occupied frequency bandwidth) of the received radio wave by the transmitting-receiving circuit 112 and the CPU 113, and starts transmission with the use of a channel (free channel) other than the channel (occupied frequency bandwidth) used by the other wireless remote control.

The CPU 113 obtains the vehicle height adjusting signal H (to be described later) in response to the switching operation of the switch SW11 to the switch SW18, tags the remote control identification code ID1 to the obtained vehicle height adjusting signal H, and sends this signal to the transmitting-receiving circuit 112.

After transmitting the vehicle height adjusting signal H, the CPU 113 immediately sends the dummy signals d to the transmitting-receiving circuit 112 continuously for a predetermined period of time (for example, 10 seconds). However, if a next switching operation is performed during the predetermined period of time, the CPU 113 discontinues the transmission of the dummy signals d halfway, and transmits the vehicle height adjusting signal H adapted for the next switching operation.

The transmitting-receiving circuit 112 searches for a channel of a free frequency by carrier sense, and uses the free frequency channel, found by this search, to transmit the vehicle height adjusting signal H tagged with the remote control identification code ID1 from the built-in antenna 111 by radio. After transmitting the vehicle height adjusting signal H tagged with the remote control identification code ID1, the transmitting-receiving circuit 112 immediately transmits the dummy signals d by radio for 10 seconds at intervals of 1 second.

For the dummy signal d, the following method, for example, can be employed: A dummy signal bit is added to the vehicle height adjusting signal H, and it can be determined that a signal with the dummy signal bit set at "1" represents the dummy signal d, while a signal with the dummy signal bit set at "0" represents the vehicle height adjusting signal H, rather than the dummy signal d.

<Explanation for the Vehicle Height Adjusting Signal>

The vehicle height adjusting signal H, which the CPU 113 obtains and outputs in response to the switching operation of the switch SW11 to the switch SW18, is as described in (1) to (9) below.

(1) At the push of the raising switch SW16 when the front axle selection switch SW11 is ON, the vehicle height adjusting signal H is outputted for supplying compressed air to the front axle air spring 140 while the raising switch SW16 keeps pushed, thereby raising the vehicle height on the front axle side.

(2) At the push of the lowering switch SW17 when the front axle selection switch SW11 is ON, the vehicle height adjusting signal H is outputted for discharging compressed air from the front axle air spring 140 while the lowering switch SW17 keeps pushed, thereby lowering the vehicle height on the front axle side.

(3) At the push of the raising switch SW16 when the rear axle selection switch SW12 is ON, the vehicle height adjusting signal H is outputted for supplying compressed air to the rear axle air spring 150 while the raising switch SW16 keeps pushed, thereby raising the vehicle height on the rear axle side.

(4) At the push of the lowering switch SW17 when the rear axle selection switch SW12 is ON, the vehicle height adjusting signal H is outputted for discharging compressed air from the rear axle air spring 150 while the lowering switch SW17 keeps pushed, thereby lowering the vehicle height on the rear axle side.

(5) At the push of the first memory switch SW13, the vehicle height adjusting signal H is outputted for exercising control for supplying and discharging compressed air to and from the front axle air spring 140 and the rear axle air spring 150 so that the vehicle heights at the front and rear axles are raised or lowered until they reach a prestored first vehicle height position.

(6) At the push of the second memory switch SW14, the vehicle height adjusting signal H is outputted for exercising control for supplying and discharging compressed air to and from the front axle air spring 140 and the rear axle air spring 150 so that the vehicle heights at the front and rear axles are raised or lowered until they reach a prestored second vehicle height position.

(7) At the push of the neutral switch SW15, the vehicle height adjusting signal H is outputted for exercising control for supplying and discharging compressed air to and from the front axle air spring 140 and the rear axle air spring 150 so that the vehicle heights at the front and rear axles are raised or lowered until they reach a prestored neutral (reference) vehicle height position.

(8) At the push of the stop switch SW18 when the vehicle height is being raised or lowered, the vehicle height adjusting signal H is outputted for urgently stopping the raising action or the lowering action.

(9) When the front axle selection switch SW11 and the rear axle selection switch SW12 are simultaneously rendered ON, the vehicle height adjusting signal H for raising or lowering the vehicle height at the front axle and the vehicle height adjusting signal H for raising or lowering the vehicle height at the rear axle may be outputted simultaneously.

<Communication Flow for the Transmission of Dummy Signal>

A communication flow (a communication check flow) for transmitting the dummy signals d from the wireless remote control 110 will be described with reference to FIG. 8.

(1) It is determined whether a switching operation has been performed (Step 1). If the switching operation has been performed, the vehicle height adjusting signal H adapted for the switching operation is outputted (Step 2), and the dummy signal d is transmitted (Step 3). A counter (software counter) n for counting the number of times that the dummy signals were transmitted is set at 1 (Step 4).

(2) In Step 5, it is determined whether 1 second has passed since the dummy signal d or the vehicle height adjusting signal H was transmitted. At a time when 1 second elapsed, a next dummy signal d is transmitted (Step 6).

(3) In Step 7, it is determined whether the counter 7 has reached 10. If the counter n has not reached 10, the counter n is incremented by one in Step 8, and the program returns to Step 5.

(4) If a determination is made in Step 5 that 1 second has not passed since the dummy signal d or the vehicle height adjusting signal H was transmitted, and a determination is made that other switching operation has been performed (Step 9), the program returns to Step 2, transmitting the vehicle height adjusting signal H adapted for the other switching operation.

(5) If the counter n is 10 in Step 7, the action of transmitting the dummy signal is brought to a halt.

In summary, after the vehicle height adjusting signal H is transmitted, the dummy signals d are immediately transmitted for 10 seconds at intervals of 1 second. However, if other switching operation is performed during this period of 10 seconds, transmission of the dummy signal d is stopped at that point in time, and the vehicle height adjusting signal H adapted for the other switching operation is transmitted. The predetermined period of time for transmission of the dummy signals d is not limited to 10 seconds, but can be set at an optimal duration, as desired. In short, the count in Step 7 can be set at a number other than 10 in the flow of FIG. 8. The transmission interval of the dummy signals d is not limited to 1 second, but can be changed to other time. In other words, the elapsed time determined in Step 5 can be changed in the flow of FIG. 8.

In setting the "predetermined period of time for transmission of the dummy signals d" and the "transmission interval of the dummy signals d", it is desirable to set these parameters to appropriate values with due consideration for the following facts: If specifications for transmitting the dummy signals for a long time (in large numbers) are drawn up, the battery is drained quickly. If specifications for transmitting the dummy signals for a short time (in small numbers) a communication abnormality during vehicle height adjustment may be undetectable.

<Explanation for the Air Supply and Discharge Control Means and Peripheral Instruments Therefor>

The receiver 120 and the air suspension ECU 130, which constitute the air supply and discharge control means, are installed within a cab 101 of a truck 100, as shown in FIG. 1. A remote control identification code registration switch 160 and an emergency operation switch 170 are connected to the receiver 120. The emergency operation switch 170 is used for vehicle height adjustment in an emergency, without using the wireless remote control 110.

An air tank 180 storing compressed air is provided on a frame 102 of the truck 100. The front axle air spring 140 is connected to the air tank 180 by air piping 181, and the rear axle air spring 150 is connected to the air tank 180 by air piping 182. Valves 183 and 184 are interposed in the air pipings 181 and 182, respectively. A front axle-side atmospheric open valve (not shown) is provided at a position in the air piping 181 closer to the front axle air spring 140 than the valve 183. A rear axle-side atmospheric open valve (not shown) is provided at a position in the air piping 182 closer to the rear axle air spring 150 than the valve 184.

The air suspension ECU 130 controls the opening or closing state of the valve 183 and the front axle-side atmospheric open valve, thereby supplying compressed air from the air tank 180 to the front axle air spring 140, or discharging compressed air from within the front axle air spring 140. Besides, the air suspension ECU 130 controls the opening or closing state of the valve 184 and the rear axle-side atmospheric open valve, thereby supplying compressed air from the air tank 180 to the rear axle air spring 150, or discharging compressed air from within the rear axle air spring 150.

The vehicle height on the front axle side is detected by a height sensor 185, and the vehicle height on the rear axle side is detected by a height sensor 186. Vehicle height data obtained by the height sensors 185 and 186 are transmitted to the air suspension ECU 130. The numerals 187, 188 denote axles.

<Explanation for the Receiver and Peripheral Instruments Therefor>

The receiver 120 is provided with a built-in antenna 121, a receiving circuit 122, a CPU 123, and a memory 124, as shown in FIG. 2. The receiving circuit 122 sequentially and cyclically searches, and receives signals from, a plurality of channels (frequency bands), allocated to a plurality of wireless remote controls, via the built-in antenna 121.

Figure 4:
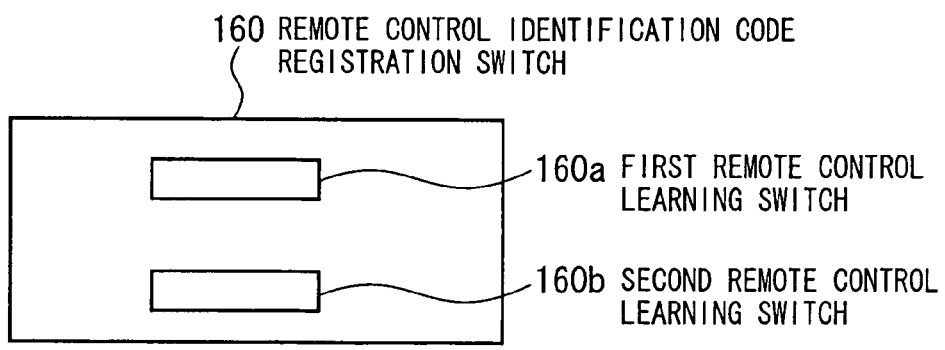
FIG. 4 is a configurational drawing showing a remote control identification code registration switch.

The remote control identification code registration switch 160 includes a first remote control learning switch 160a and a second remote control learning switch 160b, as shown in FIG. 4. By operating the remote control learning switches 160a and 160b, the CPU 123 stores remote control identification codes in the memory 124 in the following manner (identification code storage means). The remote control learning switches 160a and 160b are each switched between two states, i.e., an OPEN-state and a CLOSE-state.

Figure 5:
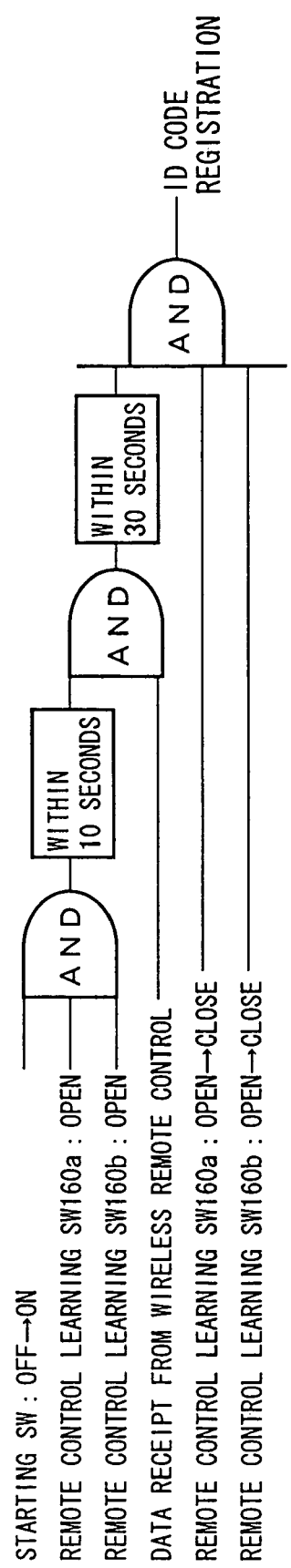
FIG. 5 is a logic diagram for illustrating a remote control identification code registration function.

The remote control identification code registration function of the CPU 123 is actually performed by software. This remote control identification code registration function will be schematically shown in FIG. 5 using a hardware logic. As schematically shown in FIG. 5, the CPU 123 works in the following manner:

(1) When the remote control learning switches 160a and 160b are both in the OPEN-state, an ignition key of the truck 100 is inserted into a key cylinder, and turned to bring a starting switch from the OFF-state to the ON-state.

(2) Within 10 seconds from the state of (1) above, data are received from a certain wireless remote control.

(3) Within 30 seconds from the receipt of the data from the above wireless remote control, the remote control learning switches 160a and 160b are brought from the OPEN-state to the CLOSE-state. By this procedure, the CPU 123 stores and registers a remote control identification code, which is contained in the data received from the certain wireless remote control, in the memory 124.

If a remote control identification code has already been stored and registered in the memory 124, the registered old remote control identification code is erased, and the remote control identification code, which is contained in the data received from the above-mentioned certain wireless remote control, is stored and registered in the memory 124. That is, the old remote control identification code is replaced by the latest remote control identification code. In the present embodiment, always one remote control identification code is stored and registered in the memory 124, but a plurality of remote control identification codes may be stored and registered therein.

In the present embodiment, moreover, an explanation is offered, provided that the remote control identification code ID1 contained in the data sent from the wireless remote control 110 is stored and registered in the memory 124 of the receiver 120.

Figure 6:
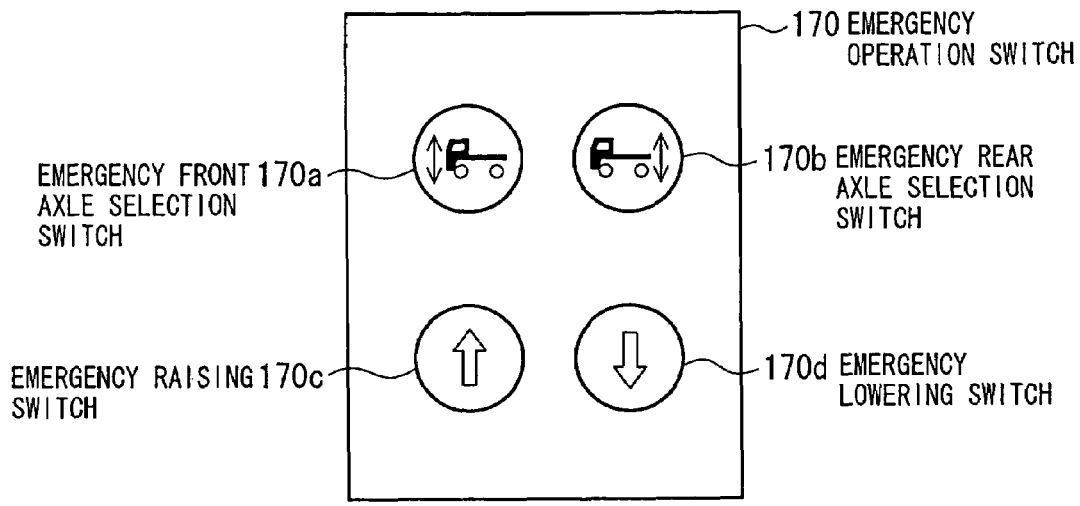
FIG. 6 is a configurational drawing showing an emergency operation switch.

The emergency operation switch 170 includes an emergency front axle selection switch 170a, an emergency rear axle selection switch 170b, an emergency raising switch 170c, and an emergency lowering switch 170d, as shown in FIG. 6. The ON-state and the OFF-state of the switches 170a to 170d are determined by the CPU 123 of the receiver 120.

When the receiving circuit 122 of the receiver 120 sequentially and cyclically searches, and receives signals from, the plurality of channels (frequency bands) allocated to the plurality of wireless remote controls, the CPU 123 makes comparison between the remote control identification code, tagged to the received vehicle height adjusting signal H, and the remote control identification code ID1 stored and registered beforehand in the memory 124. If the remote control identification code, tagged to the received vehicle height adjusting signal H, agrees with the remote control identification code ID1 stored and registered beforehand in the memory 124, the search action is discontinued, and data receipt is continued, with the receiving channel being fixed at the channel (frequency band) relevant to the agreement. In this manner, the vehicle height adjusting signal H tagged with the remote control identification code ID1 is received.

If the vehicle height adjusting signal tagged with the remote control identification code in agreement with the remote control identification code ID1 stored and registered beforehand in the memory 124 is not received in the above-mentioned fixed channel for a predetermined period of time, search for a channel (frequency band) by the receiving circuit 122 of the receiver 120 is resumed to be prepared for next signal receipt from the wireless remote control.

Furthermore, the CPU 123 has a signal switching function (corresponding to safety means recited in claim 2) which enables one of, and disables the other of, the vehicle height adjusting signal H transmitted from the wireless remote control 110 and the switching signal by the emergency operation switch 170, in accordance with predetermined conditions to be described later. Based on the enabled one signal, the CPU 123 transmits an operating signal S (its details will be described later), for exercising supply and discharge control over compressed air for the front axle air spring 140 or the rear axle air spring 150, to the air suspension ECU 130.

Figure 7A:
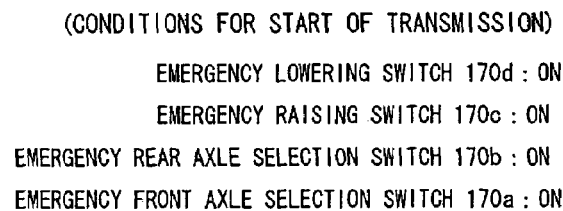
FIGS. 7(a) and 7(b) are logic diagrams for illustrating a signal switching function.
Figure 7B:
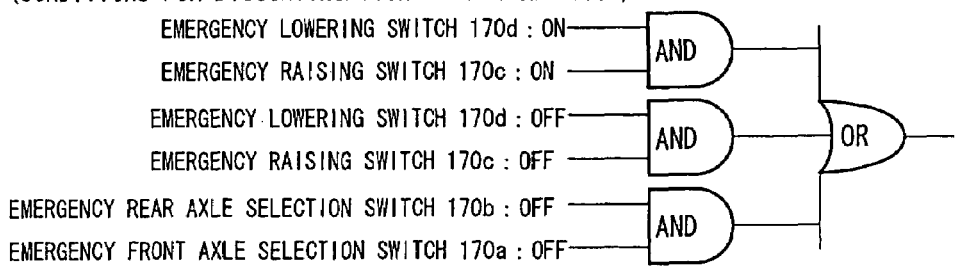

The above signal switching function is performed actually by software, but this signal switching function will be schematically shown in FIGS. 7(*a*) and 7(*b*) using a hardware logic.

As schematically shown in FIG. 7(*a*), if the CPU 123 determines that at least one of the emergency lowering switch 170d and the emergency raising switch 170c becomes ON and that at least one of the emergency rear axle selection switch 170b and the emergency front axle selection switch 170a becomes ON, the CPU 123 disables the vehicle height adjusting signal H transmitted from the wireless remote control 110, and enables the switching signal of the emergency operation switch 170. That is, the CPU 123 does not transmit the operating signal, which is based on the vehicle height adjusting signal H transmitted from the wireless remote control 110, to the air suspension ECU 130, but transmits only the operating signal, which is based on the switching signal of the emergency operation switch 170, to the air suspension ECU 130.

Even when the conditions schematically shown in FIG. 7(*a*) are fulfilled, if the CPU 123 determines that both the emergency lowering switch 170d and the emergency raising switch 170c are ON, or that both the emergency lowering switch 170d and the emergency raising switch 170c are OFF, or that both the emergency rear axle selection switch 170b and the emergency front axle selection switch 170a are OFF, as shown schematically in FIG. 7(*b*), the CPU 123 enables the vehicle height adjusting signal H transmitted from the wireless remote control 110, and disables the switching signal of the emergency operation switch 170. That is, the CPU 123 transmits only the operating signal, which is based on the vehicle height adjusting signal H transmitted from the wireless remote control 110, to the air suspension ECU 130, but does not transmit the operating signal, which is based on the switching signal of the emergency operation switch 170, to the air suspension ECU 130.

The reason why the vehicle height adjusting signal H transmitted from the wireless remote control 110 is enabled, and the switching signal of the emergency operation switch 170 is disabled, if it is determined that the emergency lowering switch 170d and the emergency raising switch 170c are both ON, is as follows: It is contradictory that the emergency lowering switch 170d and the emergency raising switch 170c are actually turned on at the same time (this is an impossible combination in the ordinary procedure). Thus, if the CPU 123 determines that the emergency lowering switch 170d and the emergency raising switch 170c are both ON, the CPU 123 makes this determination based on the determination that a harness for connecting the emergency operation switch 170 and the receiver 120 is abnormal (broken or shorted). So doing can avoid the irrational phenomenon that the wireless remote control is no more usable owing to the breakdown of the emergency operation switch 170.

After all, if the emergency operation switch 170 has been operated, and if it is not determined that there is an abnormality in the harness connecting the emergency operation switch 170 and the receiver 120, the CPU 123 disables the vehicle height adjusting signal H from the wireless remote control 110, and gives priority to the switching signal of the emergency operation switch 170. Thus, when the emergency operation switch 170 is normally acting, vehicle height adjustment is made in accordance with the operation of the emergency operation switch 170. Even if the wireless remote control 110 is operated at the same time, vehicle height adjustment by the wireless remote control is not made, so that safety is ensured.

If the emergency operation switch 170 has been operated, and if it is determined that there is an abnormality in the harness connecting the emergency operation switch 170 and the receiver 120, the CPU 123 disables the switching signal of the emergency operation switch 170, and enables the vehicle height adjusting signal H from the wireless remote control 110. Thus, in the event of an abnormality such as wire breakage or short-circuiting, vehicle height adjustment can be made by operating the wireless remote control 110.

As noted above, the CPU 123 enables one of the vehicle height adjusting signal H, transmitted from the wireless remote control 110, and the switching signal of the emergency operation switch 170, by the aforementioned signal switching function. The CPU 123 transmits the operating signal S, which has information on the enabled signal, to the air suspension ECU.

The operating signal S has a data length of 9 bits, and a system used for its transmission is a clock-synchronized system under which each bit data is transmitted in synchronism with a clock signal transmitted from the air suspension ECU 130 to the CPU 123. The transmission level of the operating signal S is a positive logic, which represents the "1"-state (High-state) when the switch is ON, and the "0"-state (Low-state) when the switch is OFF.

<Explanation for the Operating Signal when the Vehicle Height Adjusting Signal from the Wireless Remote Control is Enabled>

When the vehicle height adjusting signal H transmitted from the wireless remote control 110 is enabled by the CPU 123, each bit position of the operating signal S has the following information:

(1) bit 0 position: Represents the ON-OFF state of the front axle selection switch SW11 of the wireless remote control 110, meaning "1" when in the ON-state the front axle lamp L11 is lit, and "0" when in the OFF-state the front axle lamp L11 is extinguished.

(2) bit 1 position: Represents the ON-OFF state of the rear axle selection switch SW12 of the wireless remote control 110, meaning "1" when in the ON-state the rear axle lamp L12 is lit, and "0" when in the OFF-state the rear axle lamp L12 is extinguished.

(3) bit 2 position: Represents the ON-OFF state of the stop switch SW18 of the wireless remote control 110, meaning "1" when in the ON-state, and "0" when in the OFF-state.

(4) bit 3 position: Represents the ON-OFF state of the neutral switch SW15 of the wireless remote control 110, meaning "1" when in the ON-state, and "0" when in the OFF-state.

(5) bit 4 position: Represents the ON-OFF state of the second memory switch SW14 of the wireless remote control 110, meaning "1" when in the ON-state, and "0" when in the OFF-state.

(6) bit 5 position: Represents the ON-OFF state of the first memory switch SW13 of the wireless remote control 110, meaning "1" when in the ON-state, and "0" when in the OFF-state.

(7) bit 6 position: Represents the ON-OFF state of the raising switch SW16 of the wireless remote control 110, meaning "1" when in the ON-state, and "0" when in the OFF-state.

(8) bit 7 position: Represents the ON-OFF state of the lowering switch SW17 of the wireless remote control 110, meaning "1" when in the ON-state, and "0" when in the OFF-state.

(9) bit 8 position: Always represents "1".

<Explanation for the Operating Signal when the Switching Signal from the Emergency Operation Switch is Enabled>

When the switching signal of the emergency operation switch 170 is enabled by the CPU 123, each bit position of the operating signal S has the following information:

(1) bit 0 position: Represents the ON-OFF state of the emergency front axle selection switch 170*a* of the emergency operation switch 170, meaning "1" when in the ON-state, and "0" when in the OFF-state.

(2) bit 1 position: Represents the ON-OFF state of the emergency rear axle selection switch 170*b* of the emergency operation switch 170, meaning "1" when in the ON-state, and "0" when in the OFF-state.

(3) bit 2 position to bit 5 position: Always represents "0".

(4) bit 6 position: Represents the ON-OFF state of the emergency raising switch 170*c*, meaning "1" when in the ON-state, and "0" when in the OFF-state.

(5) bit 7 position: Represents the ON-OFF state of the emergency lowering switch 170*d*, meaning "1" when in the ON-state, and "0" when in the OFF-state.

<Control Actions for Vehicle Height Adjustment by the Air Suspension ECU>

Upon receipt of the operating signal S, the air suspension ECU 130 exercises control for supply and discharge of compressed air for the front axle air spring 140 or the rear axle air spring 150 in response to information contained in this operating signal.

(1) When the bit 0 position of the received operating signal S represents "1" and the bit 1 position "0", vehicle height adjustment on the front axle side is made in the following manner:

When the bit 7 position of the received operating signal S represents "1", the atmospheric open valve on the front axle side is opened to discharge air from the front axle air spring 140, thereby lowering the vehicle height on the front axle side. When the receipt of the operating signal S at the bit 7 position of "1" has ceased, the atmospheric open valve on the front axle side is immediately closed to stop vehicle height adjustment.

When the bit 6 position of the received operating signal S represents "1", the valve 183 is opened to supply compressed air to the front axle air spring 140, thereby raising the vehicle height on the front axle side. When the receipt of the operating signal S at the bit 6 position of "1" has ceased, the valve 183 is immediately closed to stop vehicle height adjustment.

When the bit 5 position of the received operating signal S represents "1", control for opening or closing the valves 183, 184 or the atmospheric open valves on the front axle side and the rear axle side is exercised so that the vehicle heights on the front and rear axle sides are raised or lowered until they reach the prestored first vehicle height position. If the operating signal S at the bit 2 position of "1" is received during opening or closing control of these valves, the valves 183, 184 or the atmospheric open valves on the front axle side and the rear axle side are urgently closed to stop vehicle height adjustment.

When the bit 4 position of the received operating signal S represents "1", control for opening or closing the valves 183, 184 or the atmospheric open valves on the front axle side and the rear axle side is exercised so that the vehicle heights on the front and rear axle sides are raised or lowered until they reach the prestored second vehicle height position. If the operating signal S at the bit 2 position of "1" is received during opening or closing control of these valves, the valves 183, 184 or the atmospheric open valves on the front axle side and the rear axle side are urgently closed to stop vehicle height adjustment.

When the bit 3 position of the received operating signal S represents "1", control for opening or closing the valves 183, 184 or the atmospheric open valves on the front axle side and the rear axle side is exercised so that the vehicle heights on the front and rear axle sides are raised or lowered until they reach the prestored neutral (reference) vehicle height position. If the operating signal S at the bit 2 position of "1"

is received during vehicle height adjustment, the valves 183, 184 or the atmospheric open valves on the front axle side and the rear axle side are urgently closed to stop vehicle height adjustment.

(2) When the bit 0 position of the received operating signal S represents "0" and the bit 1 position "1", vehicle height adjustment on the rear axle side is made in the following manner:

When the bit 7 position of the received operating signal S represents "1", the atmospheric open valve on the rear axle side is opened to discharge air from the rear axle air spring 150, thereby lowering the vehicle height on the rear axle side. When the receipt of the operating signal S at the bit 7 position of "1" has ceased, the atmospheric open valve on the rear axle side is immediately closed to stop vehicle height adjustment.

When the bit 6 position of the received operating signal S represents "1", the valve 184 is opened to supply compressed air to the rear axle air spring 150, thereby raising the vehicle height on the rear axle side. When the receipt of the operating signal S at the bit 6 position of "1" has ceased, the valve 184 is immediately closed to stop vehicle height adjustment.

The valve opening and closing actions upon receipt of the signals with the bit 5 position, the bit 4 position, and the bit 3 position of the operating signal S representing "1" are the same as the valve opening and closing actions performed in the aforementioned "case where the bit 0 position of the received operating signal represents "1" and the bit 1 position "0"".

(3) When the bit 0 position of the received operating signal S represents "1" and the bit 1 position "1", vehicle height adjustment on the front axle side is made in the following manner:

When the bit 7 position of the received operating signal S represents "1", the atmospheric open valves on the front and rear axle sides are opened to discharge air from the front and rear axle air springs 140 and 150, thereby lowering the vehicle heights on the front and rear axle sides. When the receipt of the operating signal S at the bit 7 position of "1" has ceased, the atmospheric open valves on the front and rear axle sides are immediately closed to stop vehicle height adjustment.

When the bit 6 position of the received operating signal S represents "1", the valves 183, 184 are opened to supply compressed air to the front and rear axle air springs 140 and 150, thereby raising the vehicle heights on the front and rear axle sides. When the receipt of the operating signal S at the bit 6 position of "1" has ceased, the valves 183, 184 are immediately closed to stop vehicle height adjustment.

The valve opening and closing actions upon receipt of the signals with the bit 5 position, the bit 4 position, and the bit 3 position of the operating signal S representing "1" are the same as the valve opening and closing actions performed in the aforementioned case where "the bit 0 position of the received operating signal S represents "1" and the bit 1 position "0"".

(4) When the bit 0 position of the received operating signal S represents "0" and the bit 1 position "0", the following actions are performed:

That is, even when the bit 7 position, the bit 6 position, the bit 5 position, the bit 4 position, and the bit 3 position of the received operating signal S represent "1", no vehicle height adjustment is performed. In other words, even when the lowering switch SW17 or 170d, the raising switch SW16 or 170c, the memory switch SW13 or SW14, or the neutral switch SW15 is pushed, the valves 183, 184 or the atmospheric open valves on the front axle side and the rear axle side remain closed.

<Explanation for Determination of Communication Abnormality>

The CPU 123 of the receiver 120 monitors the reception state of the vehicle height adjusting signal H and the dummy signal d to determine whether there is an abnormality in communication between the wireless remote control 110 and the receiver 120.

Figure 9:
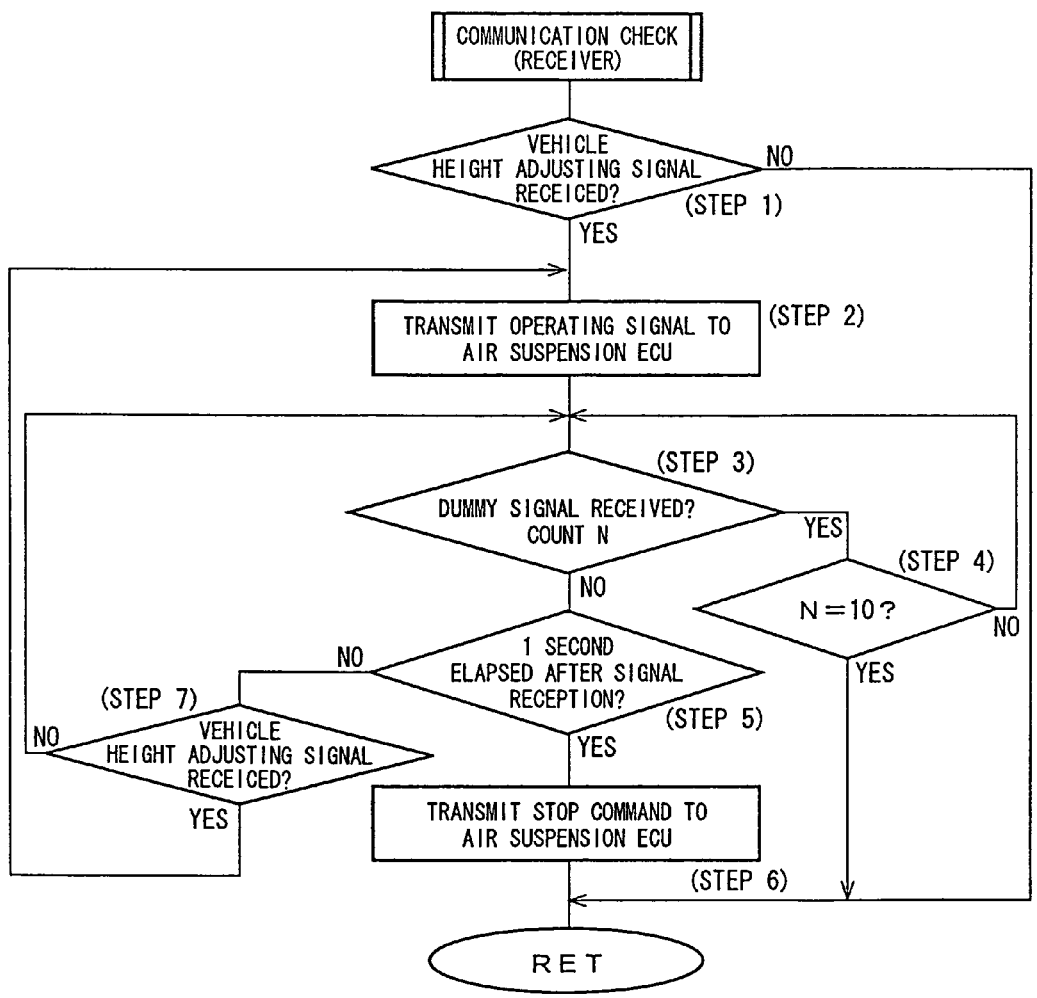
FIG. 9 is a flow chart showing a communication check flow by a receiver.

Determination of the communication abnormality will be explained along a flow shown in FIG. 9.

(1) If the vehicle height adjusting signal H has been received (Step 1), the operating signal S for performing the action adapted for information on the received vehicle height adjusting signal H is transmitted to the air suspension ECU 130 (Step 2).

(2) Upon receipt of the dummy signal d, a counter (software counter) N for counting the number of times that the dummy signals were received counts (Step 3). This counting is continued until the counter N reaches 10 (Steps 3 and 4). When the counter N has reached 10, monitoring is terminated.

(3) If a next vehicle height adjusting signal H or a next dummy signal d is not received even when 1 second has elapsed since the receipt of the vehicle height adjusting signal H, or even when 1 second has elapsed since the receipt of the preceding dummy signal d (Steps 3, 5, 7), the CPU 123 determines that a communication abnormality has occurred. Based on this determination, the CPU 123 transmits a stop command to the air suspension ECU 130 (Step 6).

When the stop command is transmitted to the air suspension ECU 130, air supply and discharge control by the air suspension ECU over the air springs 140, 150 is interrupted to interrupt the supply and discharge of air to and from the air springs 140, 150. Thus, if the communication abnormality is determined eve during the changing of the vehicle height, raising or lowering of the vehicle height is urgently stopped.

(4) If a next vehicle height adjusting signal H is received before 1 second has elapsed since the receipt of the previous vehicle height adjusting signal H or the preceding dummy signal d (Step 7), the program returns to Step 2, transmitting the operating signal S adapted for the next vehicle height adjusting signal H.

In this case, during the period from receipt of the previous vehicle height adjusting signal H until receipt of the next vehicle height adjusting signal H, the dummy signals d are continuously transmitted from the wireless remote control 110 (i.e., transmitted at intervals of 1 second), and the dummy signals d are continuously received by the receiver 120 (i.e., received at intervals of 1 second). Thus, communication between the wireless remote control 110 and the receiver 120 is carried out continuously over the channel (frequency band) that has been secured by the carrier sense when the previous vehicle height adjusting signal H began to be transmitted (i.e., communication is ensured). Hence, when the next vehicle height adjusting signal H is transmitted, communication can be continued using the channel (frequency band), which has been used continuously (i.e., through which communication has been ensured), without search for a channel (frequency band) by the receiving circuit 122. As described above, when a next vehicle height adjusting signal H is transmitted during the continuous transmission of the dummy signals d, there is no need for search for a channel on the receiver side. Thus, no delay in response occurs.

Embodiment 2

Figure 10:
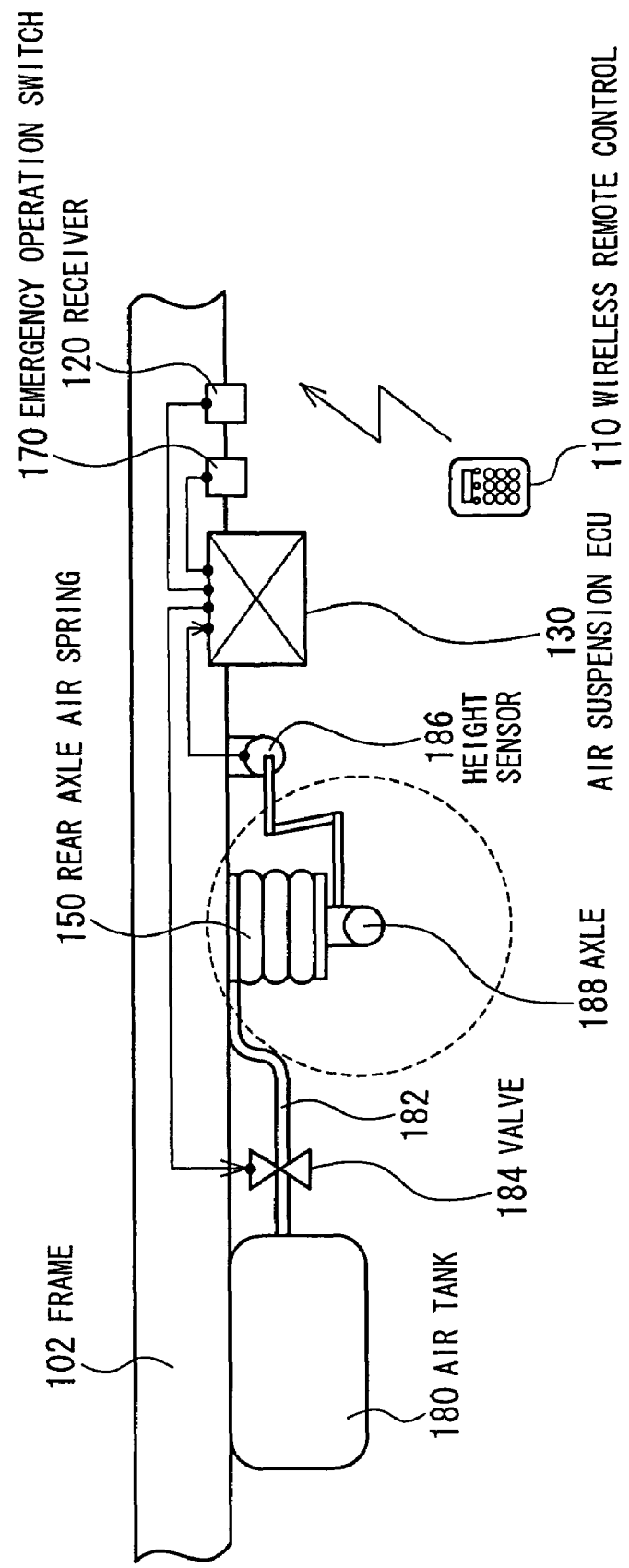
FIG. 10 is a configurational drawing showing a vehicle height adjusting apparatus according to Embodiment 2 of the present invention.
Figure 11:
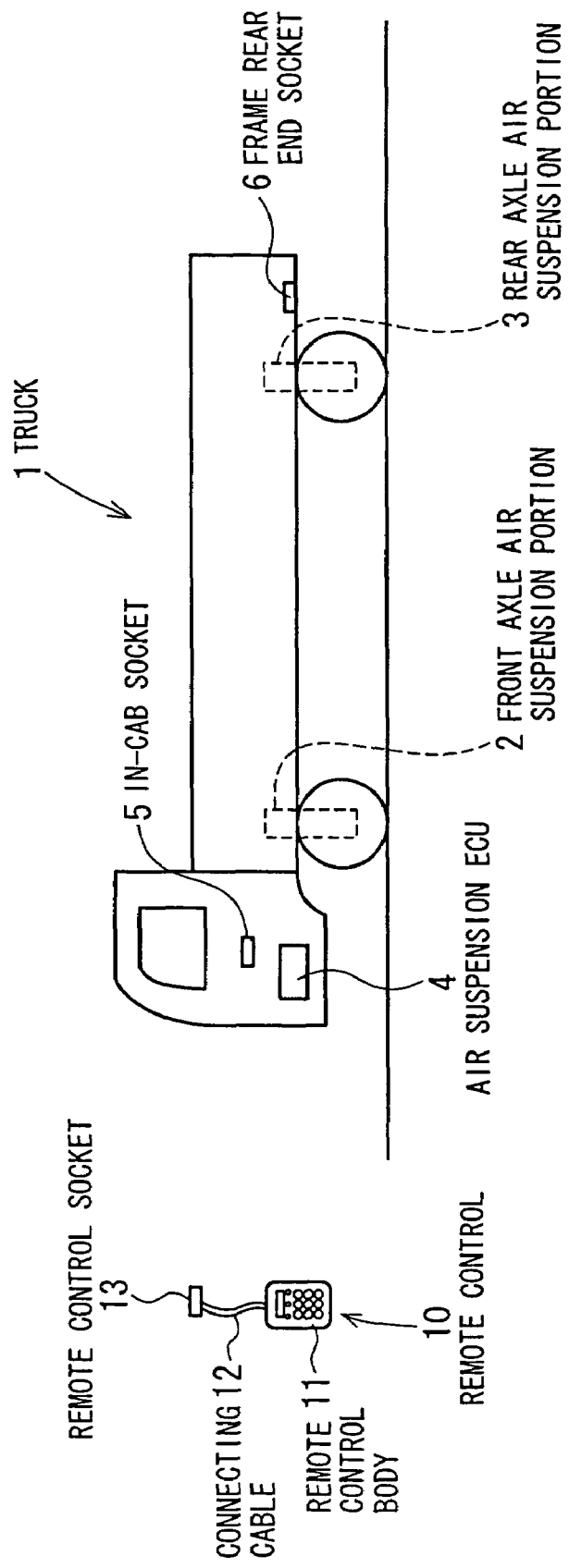
FIG. 11 is a configurational drawing showing a vehicle height adjusting apparatus according to a conventional technology.
Figure 12:
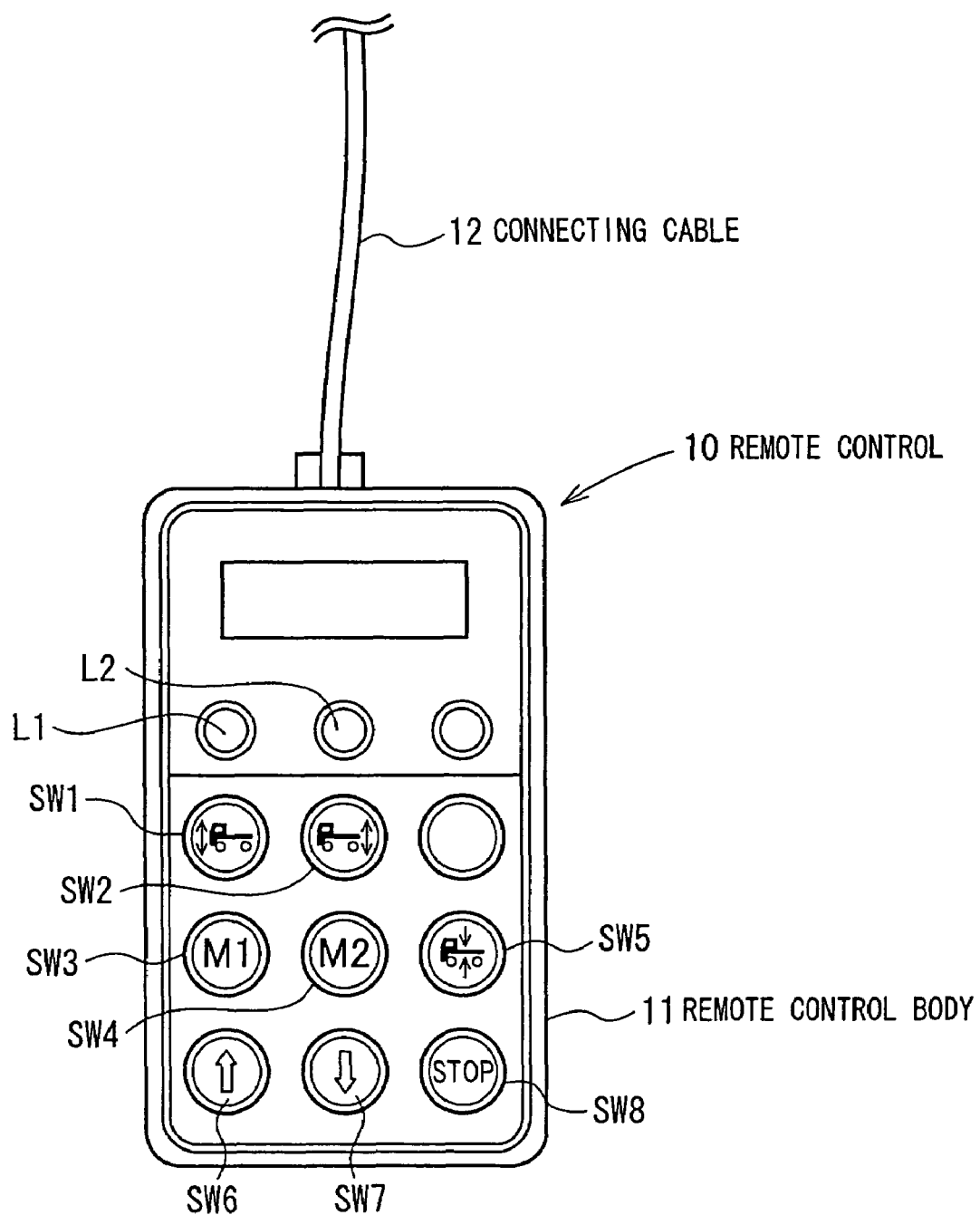
FIG. 12 is a configurational drawing showing switches of a conventional remote control.

FIG. 10 is a configurational drawing showing a vehicle height adjusting apparatus according to Embodiment 2 of the present invention. In the aforementioned Embodiment 1, the receiver 120, the air suspension ECU 130, and the emergency operation switch 170 are disposed within the cab. In the present Embodiment 2, on the other hand, the receiver 120, the air suspension ECU 130, and the emergency operation switch 170 are disposed on the frame 102 of the truck.

In this Embodiment 2, moreover, the same remote control identification code ID1 is preregistered in the wireless remote control 110 and the receiver 120, and the remote control identification code registration switch is not used. The features and the actions and functions of the other portions are the same as those in Embodiment 1.

With the vehicle height adjusting apparatus of Embodiment 2, the emergency operation switch 170 is disposed on the frame 102. Thus, there is the advantage that the driver or the like, who has gone out of the cab, can perform an emergency operation outside the vehicle to make vehicle height adjustment.

While the present invention has been described by the foregoing embodiments, it is to be understood that the invention is not limited thereby, but may be varied in many other ways. For example, these embodiments, have been described in connection with the vehicle equipped with the air springs and the air suspension ECU. However, the present invention can also be practiced, for example, in a vehicle provided with a hydropneumatic suspension, or in a vehicle having a mechanical vehicle height adjusting function. The vehicle provided with the hydropneumatic suspension has a means utilizing an oil pressure as the vehicle height adjusting means. The vehicle having the mechanical vehicle height adjusting function has a means, which actuates a drive device in charge of vehicle height adjustment, as the vehicle height adjusting means. These embodiments have also been described with reference to the truck. However, the present invention can also be practiced in other vehicles such as passenger cars or buses. Such variations are not to be regarded as a departure from the spirit and scope of the invention, and all such modifications as would be obvious to one skilled in the art are intended to be included within the scope of the appended claims.

What is claimed is:

1. A vehicle height adjusting apparatus including
a controller, which transmits a vehicle height adjusting signal for adjusting a height of a vehicle, and
vehicle height adjusting means for adjusting said height of said vehicle based on said vehicle height adjusting signal transmitted from said controller, wherein transmission of said vehicle height adjusting signal from said controller to said vehicle height adjusting means is performed by radio,
wherein said vehicle height adjusting means includes auxiliary vehicle height adjusting means capable of adjusting said height of said vehicle by operating an emergency operation switch connected to said vehicle height adjusting means, and
safety means which disables said vehicle height adjusting signal from said controller, if said auxiliary vehicle height adjusting means is in action, and no abnormality is detected in said emergency operation switch, and which enables said vehicle height adjusting signal from said controller, if said auxiliary vehicle height adjusting means is out of action, or if said auxiliary vehicle height adjusting means is in action, and an abnormality is detected in said emergency operation switch.

2. The vehicle height adjusting apparatus according to claim 1, wherein said controller transmits dummy signals continuously for a predetermined period of time after transmitting said vehicle height adjusting signal, and said vehicle height adjusting means has vehicle height adjustment interruption means for interrupting adjustment of said height of said vehicle if receipt of said dummy signals stops during said predetermined period of time.

3. The vehicle height adjusting apparatus according to claim 2, wherein
said controller includes
a free frequency channel detection means for detecting a frequency channel that is not a frequency channel used for a radio transmission of another controller, before starting said transmission of said vehicle height adjusting signal by radio, and
a free frequency channel utilization means for transmitting said vehicle height adjusting signal and said dummy signals by utilizing said free frequency channel detected by said free frequency channel detection means.

4. The vehicle height adjusting apparatus according to claim 2, wherein
said vehicle height adjusting means includes
air springs provided in said vehicle, and
air supply and discharge control means for adjusting said height of said vehicle by controlling supply and discharge of air within said air springs.

5. The vehicle height adjusting apparatus according to claim 1, wherein
said controller includes
a controller identification code for uniquely identifying said controller, and
identification code transmission means for radio-transmitting said controller identification code, and
said vehicle height adjusting means includes identification code storage means for prestoring said controller identification code, and
controller identification means which responds to said vehicle height adjusting signal from said controller only when said controller identification code stored by said identification code storage means and said controller identification code radio-transmitted by said controller agree with each other.

* * * * *